United States Patent [19]

Soffer et al.

[11] 3,745,441
[45] July 10, 1973

[54] SELF-EXCITATION DEVICE FOR AN ALTERNATOR

[76] Inventors: Jacques Soffer, 43 rue Pasteur, 92 Sceaux; Gilbert Vidal, Oree de Senart, 91 Draveil, both of France

[22] Filed: June 19, 1972

[21] Appl. No.: 264,325

Related U.S. Application Data

[63] Continuation-in-part of Ser. No. 125,254, March 17, 1971, abandoned.

[52] U.S. Cl.................. 322/20, 290/14, 318/142, 318/158, 322/24, 322/28, 322/73
[51] Int. Cl. ............................................ H02p 9/30
[58] Field of Search .................. 322/14, 15, 16, 20, 322/24, 25, 28, 70, 73, 75, 76, 78; 290/11, 14; 318/142, 158

[56] References Cited
UNITED STATES PATENTS

| | | | |
|---|---|---|---|
| 3,263,142 | 7/1966 | Adoutte et al. ................. | 290/14 X |
| 3,351,843 | 11/1967 | Tipton .............................. | 322/28 |
| 3,435,326 | 3/1969 | Zechlin ............................. | 322/25 |

*Primary Examiner*—J. D. Miller
*Assistant Examiner*—H. Huberfeld
*Attorney*—Paul M. Craig, Jr. et al.

[57] ABSTRACT

Self-excitation device for an electric supply alternator supplying, through a rectifier bridge, direct current motors, more particularly, drive motors for self-propelled railway vehicles fitted with heat engines and electric transmission. In order to increase the control precision, each thyristor of the bridge supplying the excitation winding of the alternator is controlled by a control circuit which is synchronized with the help of a selection circuit, by one or the other of the voltages obtained between the outputs of the alternator and ground.

10 Claims, 12 Drawing Figures

SELF-EXCITATION DEVICE FOR AN ALTERNATOR

This is a continuation-in-part of my copending application Ser. No. 125,254, filed Mar. 17, 1971, now abandoned.

The present invention relates generally to a self-excitation device for an electric supply alternator supplying, through a rectifier bridge, direct current motors, more particularly, drive motors for self-propelled vehicles fitted with a heat engine and an electric transmission.

This type of vehicle is equipped with a generator set supplying the drive motors, these latter being, in general, of the direct current type. The generator set consists of a heat engine and either a direct current generator or an alternator. When an alternator is mechanically connected to the heat engine, the alternating current it supplies must be rectified to supply the drive motors. According to known equipment, the excitation of this alternator can be provided either by an auxiliary generator or by self-excitation, using the output voltage of the alternator. In this latter case, the necessity for using all the range of characteristics of the alternator has generally led to the supplying of the excitation winding of the alternator with a voltage obtained at the output of a rectifier bridge whose inputs are directly connected to the alternating current outputs of the alternator. This bridge of controlled rectifiers, which will be designated hereinafter as an "excitation bridge," may also comprise non-controlled rectifiers, which are connected in common with the supply bridge.

The rectifier bridge supplying the excitation winding is a bridge which comprises thyristors which are triggered by means of a gate control device which sends out to the control electrodes of the thyristors signals which are shifted, in relation to the anode voltage of the thyristors, through an angle which is regulated in proportion with the difference between the alternating current output voltage of the alternator and a reference voltage for keeping the alternating current output voltage approximately equal to the reference voltage. Preferably, the phase references of the gate control device are supplied by resistive attenuators connected between the phase and ground.

These control circuits receive signals that constitute phase references and which are formed from the output phase voltages of the alternator. These phase references are conventionally furnished by the secondary windings of transformers whose primary windings may be connected between the output terminals of the alternator. The form of these phase reference signals is greatly modified when the alternator furnishes a significant current under a low voltage, particularly at the time of the start of the vehicle whose drive must be assured, and it is difficult to furnish the starting or ignition pulses exactly at the proper instants.

Furthermore, the prior art self-excitation devices have the drawback that the excitation winding is sometimes damaged by the excess voltage peaks that appear at the output of the alternator.

It is the object of the present invention to allow for a more exact ignition or starting of the thyristors of the excitation bridge. It is concerned with and directed to a self-excitation device for an electric supply alternator for direct current motors, this alternator comprising an excitation winding and several output terminals which supply these motors through a rectifier supply bridge. The device of the present invention generally comprises a rectifier excitation bridge connecting each of the output terminals of the alternator to a first terminal of this excitation winding by way of a first controlled rectifier and to the second terminal of this winding by way of a second rectifier in such a manner as to supply this excitation winding with direct current; a free-wheel diode connected in parallel with this excitation winding in the appropriate sense so as to allow for the current flowing through this winding to pass again through this diode; a comparator comparing the voltage that is rectified by means of this rectifier supply bridge with a reference voltage and furnishing a difference signal representative of the difference between these two voltages; gate control circuits each having an output connected to one of said first rectifiers, one regulation input receiving this error signal two phase inputs and one control input; means for furnishing to each of said phase inputs a reference phase signal which is representative of the voltage between one of the output terminals of said alternator and said second terminal of the excitation winding; selecting means sensitive to the operating system of said motors and alternator in order to furnish to said control input of each of said gate control circuits a logic control signal assuming either a first or a second value, each of these gate control circuits being disposed so that said output thereof furnishes a starting signal to one of said first rectifiers after one of these two phase inputs has received a reference phase signal, with a time shift controlled by said difference signal in such a manner as to firmly establish and control the voltage which has been rectified by said rectifier supply bridge with respect to said reference voltage, this phase input being either one or the other of these two phase inputs, depending upon the value of said logic control signal.

According to another preferred embodiment, the self-excitation device comprises, moreover, with a view to providing limiting of the voltage peaks, and to protect the excitation winding whose insulation is generally designed for fairly low voltages, a transformer whose primary winding is connected, on the one hand, to the cathodes of the thyristors, and on the other hand, to ground, through a high capacity condenser, and whose secondary winding is connected, on the one hand, to a diode connected to the positive pole of a direct current voltage source having no inductance coil, and, on the other hand, to ground, whereas the diode is arranged in a direction such that, when at rest, it prevents the current in the direct current voltage source from crossing the secondary winding, and that the winding direction of the secondary winding is such that any positive voltage peak in the primary winding above a certain threshold has the effect of energizing the diode.

The self-excitation device of the present invention will now be described with reference to the accompanying drawings, and wherein.

Figure 1:
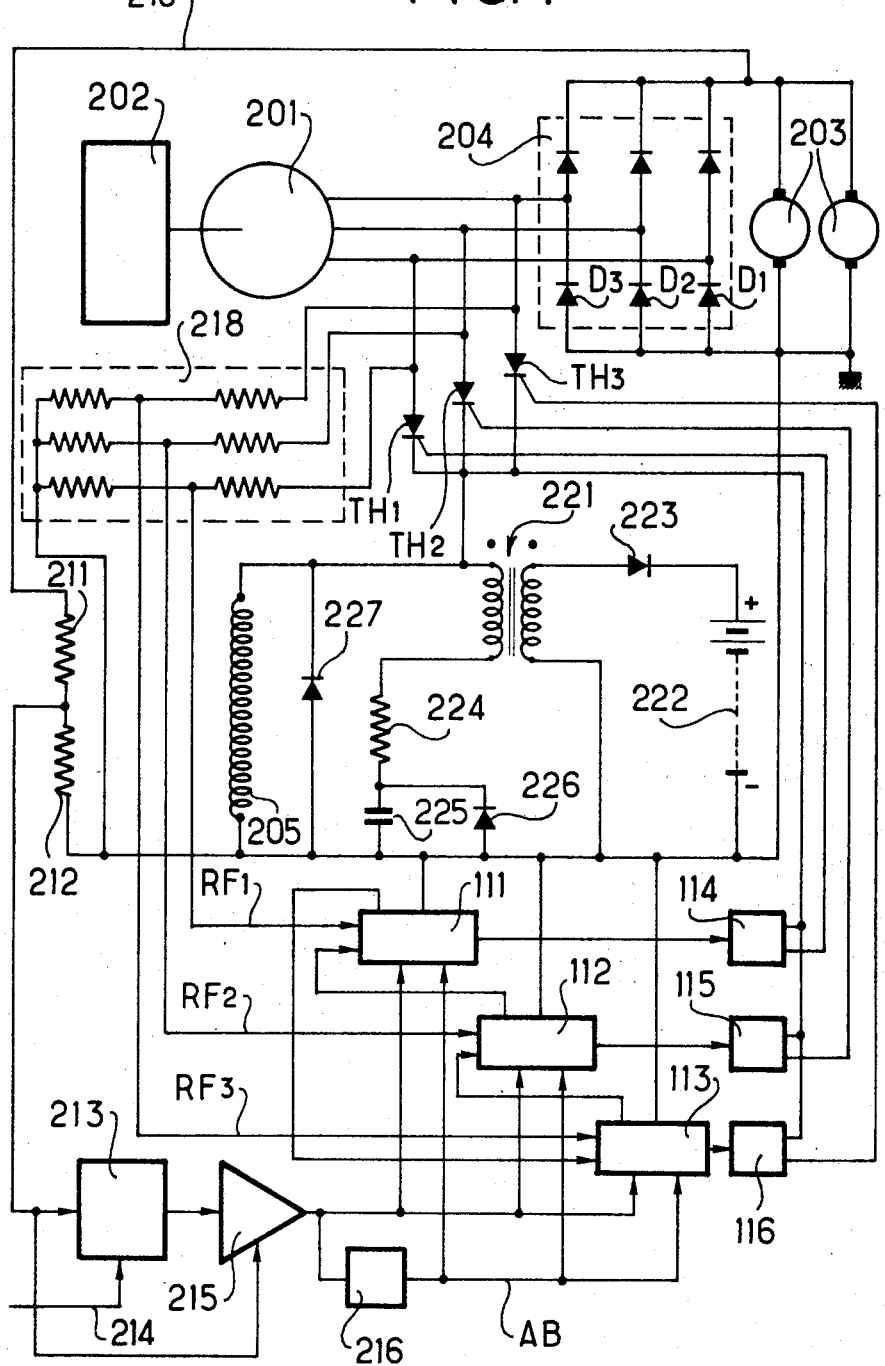
FIG. 1 is a schematic diagram of a control system for a drive device in accordance with the present invention.

In the arrangement shown in FIG. 1, an alternator 201 driven by a heat engine 202 supplies the pair of drive motors 203 from the direct current output of a rectifier bridge 204. The excitation winding 205 of the alternator 201 is supplied by a direct current voltage obtained by rectifying the alternating voltage supplied by the alternator 201. This rectifying process is effected by an excitation bridge composed of three thyristors TH1, TH2, TH3 and three diodes D1, D2, D3, which also form part of the bridge 204. The winding 205 is connected by means of a first terminal to the cathodes of the three thyristors TH1, TH2, and TH3, and by means of a second terminal to ground, to which the anodes of the three diodes D1, D2, and D3 are also connected.

The regulation of the direct current voltage applied to the excitation winding 205 is effected by gate control circuits 111, 112, and 113, which send to the control electrodes of the thyristors TH1, TH2, and TH3, starting signals which are shifted with respect to the anode voltage of these thyristors through an angle which is regulated in proportion to the difference between the alternating current output voltage of the alternator and a reference voltage in such a manner as to obtain a servo control.

For the purpose of obtaining the servo control of the rectified voltage applied to the pair of motors 203, the rectified voltage is sampled at line 210 and applied through a voltage divider consisting of two resistors 211 and 212 to the input of a voltage comparator 213, which receives a reference voltage at a second input 214. The difference signal TC collected at the output of the comparator 213 is transmitted to an amplifier 215, whose amplification is controlled by the rectified control voltage via line 210 so as to be inversely proportional to the magnitude of this voltage, with the result that the servo control is rendered stable. The amplified difference signal TC is applied to the gate control circuits 111, 112, and 113, which receive, moreover, the phase reference signals RF1, RF2, and RF3 collected at the anodes of the thyristors TH1, TH2, and TH3 and transmitted by a unit 218 of resistive attenuators, arranged between the line and ground, with a view to improving the stability.

Each of the gate control circuits 111, 112, and 113, whose detailed construction will be described hereinbelow, receives a logic control signal AB furnished by a selection circuit 216, which is controlled by the difference signal TC received at the output of the amplifier 215. This logic signal assumes the value "zero" when the aforementioned difference signal becomes lower than a predetermined threshold, which is produced when the locomotive drawn by the motors 203 starts. On the other hand, the logic signal assumes the value "one" if this difference signal becomes greater than a second predetermined threshold, which is greater than the first threshold and which is produced when this locomotive rolls at normal speed.

Each of the gate control circuits receives, in fact, two distinct phase reference signals and the role of the logic control signal AB, as will be explained hereinafter, is to effect a synchronizing of each of these circuits, sometimes on one and sometimes on the other of these two reference phase signals. As far as the difference signal transmitted by the amplifier 215 is concerned, it is used to control, for each circuit, the time shift between the reference phase signal and the starting signal being furnished to the thyristors, the latter signal being the more delayed the greater the magnitude of the voltage being rectified by the bridge 204 with respect to the reference voltage.

The starting signals furnished by the gate control circuits 111, 112, and 113 are applied to starting circuits 114, 115, and 116, which are connected to the control electrodes of the respective thyristors TH1, TH2, and TH3 for furnishing thereto starting pulses of proper form and amplitude.

The excitation winding 205, whose insulation is generally provided for rather low voltages, must be protected against excess voltage peaks. For this purpose, a voltage peak limitation device comprises a transformer 221, whose secondary is connected to a battery 222, for example, the usual battery of the locomotive, by means of a diode 223. The primary of the transformer is in series with a resistor 224 and a high capacity capacitor 225, which blocks the direct current voltage, and at whose terminals a diode 226 is connected for purposes of protecting the capacitor 225 against inverse voltages.

The voltage which is applied to the terminals of the capacitor 225 is equal to the average voltage of the excitation winding 205, which is low. The resistor 224 has the function of damping the oscillating circuit formed by the excitation winding 205 and the capacitor 225, and the voltage at its terminals also remains low. The voltage at tee terminals of the primary winding of the transformer cannot exceed the voltage of the battery, multiplied by the transformation ratio, taking into account the voltage drop of the diode and the leakages of the transformer. In the usual manner, a free-wheel diode 227 is disposed across the terminals of the excitation winding 205 in such a manner as to provide a path for the current, which flows through this winding, if none of the thyristors TH1, TH2, and TH3 has been started.

Figure 2:
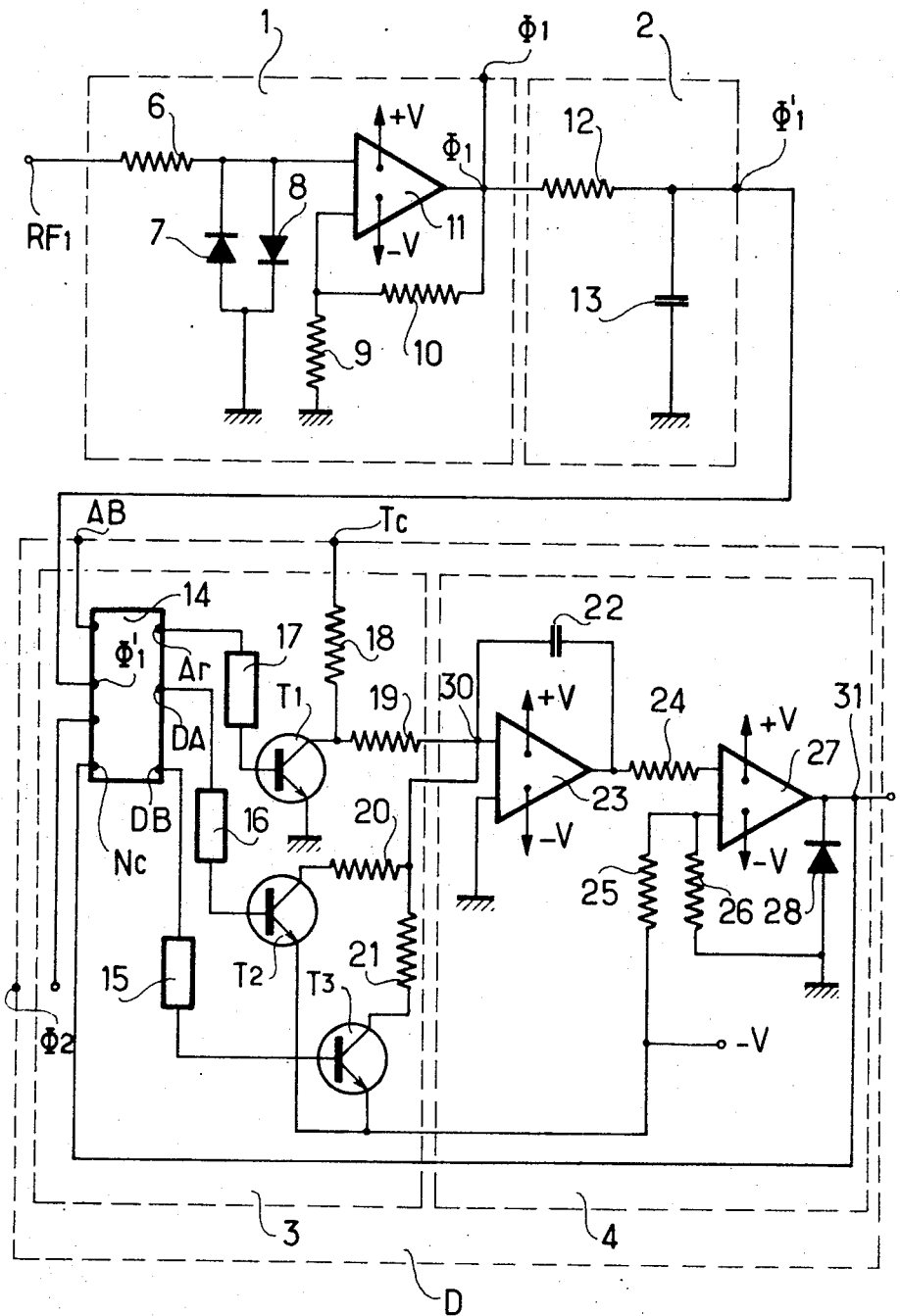
FIG. 2 is a schematic circuit diagram of a gate control circuit forming part of the device shown in FIG. 1.

FIG. 2 illustrates the gate control circuit 111, for example, in which reference numeral 1 represents a shaping circuit for shaping the phase reference signal RF1, while reference numeral 2 identifies a filter, and reference symbol D designates a phase shifter. The shaping circuit 1 is essentially composed of an operational amplifier 11 having a direct input and an inverted input. The reference voltage RF1 is applied, by way of a resistor 6 to the inverted input of the operational amplifier 11, which is also connected through two inversely connected diodes 7 and 8 to ground. It is the function of these two diodes to clip the peak off this signal applied to the amplifier 11. The direct input of the amplifier 11 is connected to ground by way of a resistor 9 and a resistor 10 is connected between the output $\Phi 1$ of the amplifier 11 and the direct input. Thus, there is obtained in a conventional manner an output signal which may assume only two distinct values, depending upon the value of the voltage RF1.

The filter 2, which is a low-pass-type filter, is composed of a resistor 12, one end of which is connected to the output of the amplifier 11 and the other end of which is connected with a terminal of a capacitor 13, with the other terminal of this capacitor being connected to ground. At the common point between elements 12 and 13, a filtered signal $\Phi'1$ is obtained.

The phase shifter D comprises a circuit 3 for the change and discharge of a control capacitor 22, and a circuit 4 consisting of an integrator and a threshold circuit. The circuit 3 comprises a logic assembly 14, three adaptors 15, 16, and 17, and three transistors T1, T2, and T3. The logic assembly 14 comprises four inputs AB, $\Phi'1$, $\Phi 2$, and Nc, and three outputs DA, DB and Ar, the signals represented by these inputs and outputs being respectively designated by the same reference numerals. The following functions will be obtained:

$$DA = \overline{AB} \cdot \overline{\Phi'1} \cdot Nc \tag{1}$$

$$DB = \overline{AB} \cdot \Phi 2 \cdot Nc \tag{2}$$

$$Ar = \overline{AB} \cdot \Phi'1 + AB \cdot \overline{\Phi 2} \tag{3}$$

Each of the transistors T1, T2, and T3 is connected to an output of logic assembly 14 by means of an adaptor which is inserted in its base circuit. The transistor T1 is connected with output Ar by adaptor 17; the transistor T2 is connected with output DA by adaptor 16; and the transistor T3 is connected with output DB by adaptor 15.

When the logic output signals DA, DB and Ar are at a low level being defined herein by the "0" state, the transistors T1, T2 and T3 are in the blocked condition. The emitter of transistor T1 is connected to ground; the emitters of transistors T2 and T3 are connected to the potential −V of a continuous supply source; and, the collector of transistor T1 is connected to the common point of two resistors 18 and 19. The resistor 18 receives the difference signal Tc and the resistor 19 is connected to an input 30 of the circuit 4. The collector of transistor T2 is connected to the input 30 by means of a resistor 20, and the collector of the transistor T3 is connected to the same input 30 by means of a resistor 21.

Figure 3:
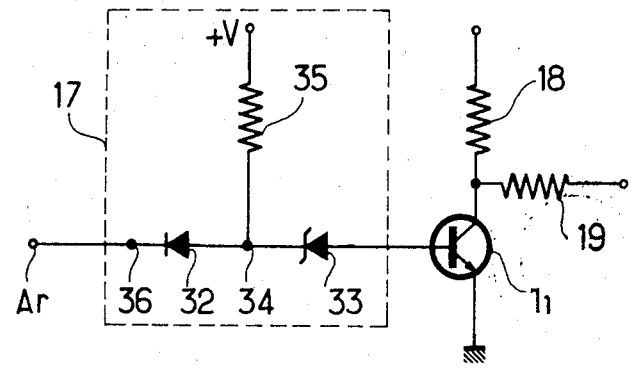
FIGS. 3 and 4 are circuit diagrams of two elements of the circuit of FIG. 1.

The logic group 14 may be realized with any known means, either with discrete elements, or preferably with integrated circuits. One will preferably use logic circuits which can operate at high voltage, in the order of 15 volts for example, and whose logic elements operate by current extraction. In this case, the adaptors, all of which are identical, are made in accordance with the schematic illustration of FIG. 3, which shows the adaptor 17 connecting the output Ar of logic group 14 with the base of transistor T1. In this figure, a diode 32 is connected in series with a Zener diode 33, the cathode of diode 32 being connected to a terminal 36 which is connected in turn to the output Ar of the logic group 14 and the anode thereof being connected to the cathode of the Zener diode 33, whose anode is connected to the base of transistor T1. The common point 34 between elements 32 and 33 is connected to the potential +V of a direct current supply by way of a resistor 35. When the output Ar is in the "1" condition, the terminal 36 is carried at the potential +V, which blocks the diode 32. The base of transistor T1 is then positively polarized by the resistor circuit 35 and the Zener diode 33 with the voltage +V. The transistor T1 is brought to saturation and the potential of the collector thereof is close to ground. When the output Ar is carried at the "0" condition, the potential of the terminal 36 is close to ground, the diode 32 is conductive and the potential of the point 34 is close to ground. The Zener diode is not conductive and the transistor T1 is blocked.

The circuit 4 of the phase shifter D comprises an integrator of the conventional type consisting of an operational amplifier 23 having the control capacitor 22 connected in the feedback path thereof between the inverted input 30 and the output. The direct input of the amplifier 23 is connected to ground and the output thereof is connected by way of a resistor 24 to the inverted input of an operational amplifier 27 forming the principle element of a threshold circuit. A direct input of amplifier 27 is connected to the voltage −V by means of a resistor 25 and to ground by way of a resistor 26. The operational amplifier 27 has its output 31 connected to the cathode of a diode 28, whose anode is connected to ground. The circuit thus constituted forms a detector of the end of the discharge of the capacitor 22. The output 31 of this detector is connected to the input Nc of the logic circuit 14 in order to furnish thereto a signal for inhibiting the discharge.

Figure 4:
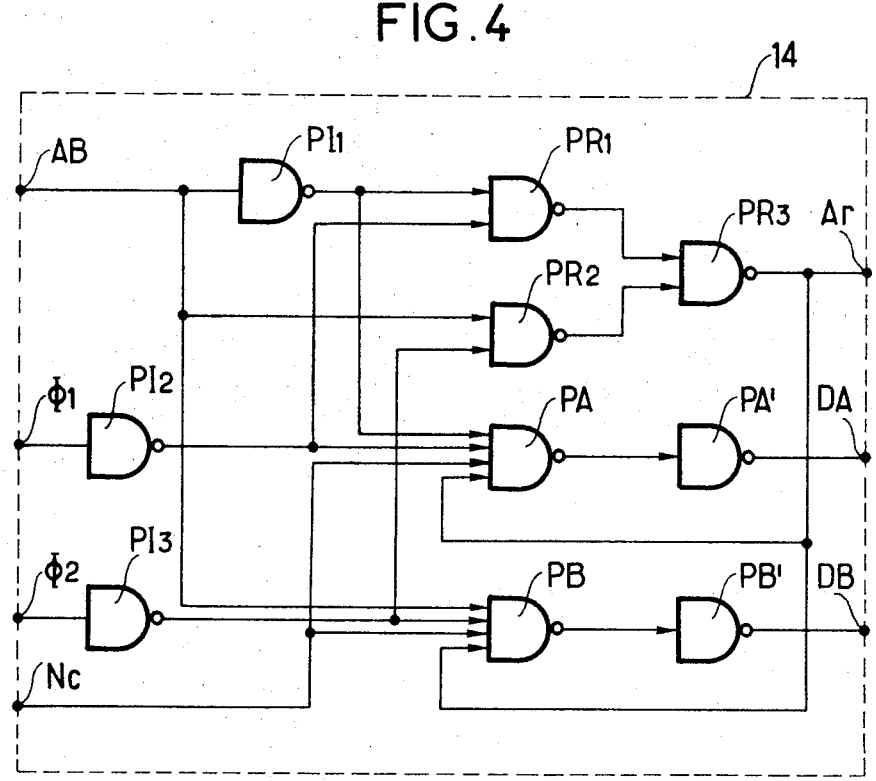

This logic circuit 14 may be realized, for example, in the manner shown in FIG. 4 with the aid of 10 gates of the NAND type.

Three inversion gates PI1, PI2, and PI3 receive the signals AB, $\phi'1$ and $\phi 2$ and provide at their respective outputs the complementary signals $\overline{AB}$, $\overline{\phi'1}$ and $\overline{\phi 2}$. A gate PR1 receives the signals $\overline{AB}$ and $\overline{\phi'1}$ and furnishes at its output a signal $\overline{AB} \cdot \overline{\phi'1}$. A gate PR 2 receives the signals AB and $\overline{\phi 2}$ and furnishes at its output a signal $\overline{AB} \cdot \overline{\phi 2}$. A gate PR3 receives the signals furnished by the gates PR1 and PR2 and furnishes at its output the signal $Ar = \overline{AB} \cdot \overline{\phi'1} + AB \cdot \overline{\phi 2}$.

A gate PA receives the signals $\overline{AB}$, $\overline{\phi 1}$, Nc and Ar and applies through an inversion gate PA the signal
$DA = \overline{AB \cdot \overline{\phi'1} \cdot Nc \cdot Ar} = \overline{AB} \cdot \overline{\phi'1} \cdot Nc$
A gate PB receives the signals AB, $\overline{\phi 2}$, Nc and Ar and applies through an inversion gate PB' the signal
$DB = \overline{AB \cdot \overline{\phi 2} \cdot Nc \cdot Ar} = \overline{AB} \cdot \overline{\phi 2} \cdot Nc$.

The introduction of the signal Ar in the formation of the signals DA and DB does not change their logic values and avoids operating trouble or breakdowns at the time of certain value changes.

The operation of the circuit is as follows:

A signal RF1 is transformed by the shaping circuit 1 into a signal $\phi 1$ being present in the form of rectangular wave. After filtering in the filter 2, one obtains a filtered signal $\phi'1$ having the form of a quasi-rectangular wave. The signal $\phi'1$ is applied to the logic group 14 which also receives logic signals AB, $\phi2$ and Nc on the corresponding inputs, AB being the logic control signal, $\phi2$ being a reference signal derived from the circuit 112 of FIG. 1 and performing in this generator the same function as the reference signal $\phi1$ in the generator 111.

The difference signal Tc, which is positive, is applied to the input of the operational amplifier 23 and allows the capacitor 22 to be charged linearly as a function of time as long as the logical signal Ar has the value "O." Two cases must then be distinguished: $AB = 0$ or $AB = 1$, while assuming that $Nc = 1$. Let us assume that $AB = 0$. As long as $\phi'1 = 0$, the logic unit 14 delivers a logic signal DA having the value 1 to the transistor T2; the latter becomes conductive and the capacitor 22 is discharged with a constant current through the resistor 20 and the transistor T2. At the same time, the logic unit 14 delivers a signal Ar having a value 1 to the transistor T1 which becomes conductive and shuts the current furnished by the control signal Tc to ground through the resistor 18 connected in series with transistor T1. This shunting lasts as long as the signal Ar exists, and according to the equation (3), this signal exists only for $\phi'1 = 0$. When $\phi'1$ becomes equal to 1, Ar, becomes zero, the transistor T1 is blocked and the capacitor 22 will again be recharged.

Let us assume that $AB = 1$. As long as $\phi2 = 0$, the logic unit 14 delivers a logic signal DB having a value 1 to the transistor T3 which becomes conductive, and the capacitor 22 is discharged with a constant current through the resistor 21 and the transistor T3. At the same time, the logic unit 14 delivers a signal Ar having a value 1 to the transistor T1, which becomes conductive and shunts the current furnished by the control signal Tc to ground through the resistor 18 connected in series with transistor T1. This shunting lasts as long as the signal Ar exists, and according to the equation (3), this signal exists only for $\phi2 = 0$. When $\phi2$ becomes equal to 1, Ar becomes zero, the transistor T1 is blocked and the capacitor 22 is again recharged.

The discharge time of the capacitor 22 is a function of the constant discharge current, which is regulated either by the resistor 20, if $AB = 0$, or by the resistor 21, if $AB = 1$. For a given discharge current, the discharge time is a function of the charge voltage Vc, which depends in turn upon the value of the voltage Tc with which the capacitor 22 is charged. The discharge time of the capacitor 22 is rendered at most equal to the duration of the zero portion of signal $\phi'1$ or of signal $\phi2$. The limits within which it is possible to have this time vary depending upon the value of the signal AB will become more apparent from the description of the waveforms illustrated in FIG. 5.

When the capacitor 22 is discharged, the voltage at the output of the operational amplifier 23 is practically at ground potential. The second operational amplifier 27, which has its inverted input connected to the output of amplifier 23 by way of the resistor 24 is disposed so that its output 31 will always be negatively saturated, which is to say in such a manner that the potential thereof tends to be close to the potential $-V$. The presence of the diode 28 limits the potential of the output 31 in the neighborhood of zero. The output 31 is then at the "0" state.

As soon as the capacitor 22 becomes charged, the potential of the output of the amplifier 23 decreases and the output voltage of the amplifier 27 flip-flops instantly to positive saturation in the neighborhood of the potential $+V$. The signal Nc at the output 31 then has the value $+V$. This condition persists as long as the capacitor 22 is charged. If the reference signal, for example signal $\phi'1$ when $AB = 0$, assumes the value 0, which stops the charge of the capacitor 22 by unblocking the transistor T1 and controls the discharge thereof by unblocking the transistor T2, the potential of the output of the amplifier 23 increase up to a threshold beyond which the amplifier 27 flip-flops to the "0" state.

If $AB = 1$, and if the reference signal $\phi2$ assumes a value 0, it is apparent according to the equations (2) and (3) that the charge is stopped by unblocking of the transistor T1 and that the discharge is controlled by the unblocking of transistor T3.

It is apparent from equations (1) and (2) that DA and DB are in the "0" state as soon as Nc reassumes the "0" state, which has the result of preventing the discharge of the capacitor 22 by transistors T2 or T3. The descending edge of the signal Nc in the circuit 114 is utilized to cut-off the thyristor TH1 of FIG. 1.

Figure 5:
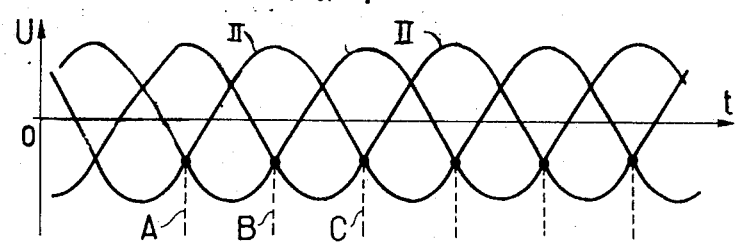
FIG. 5 illustrates the waveform diagrams of the three output phases of an alternator.

FIG. 5 represents as a function of time the theoretical diagrams of the three alternating voltages I, II, and III at the output terminals of the alternator 201 of FIG. 1. The diagrams of the phases I and II intersect at the instant A, the diagrams of the phases II and III intersect at the instant B, and the diagrams of the phases III and I intersect at the instant C. When reference RF1 is used to deliver the signal $\phi'1$ to the logic unit 14 of FIG. 2, the thyristor TH1 of FIG. 1 can be ignited only within the interval comprised between A and C, and it must, in fact, be ignited only within a shorter interval in order to prevent two thyristors of the excitation bridge from becoming conductive simultaneously.

Figure 6:
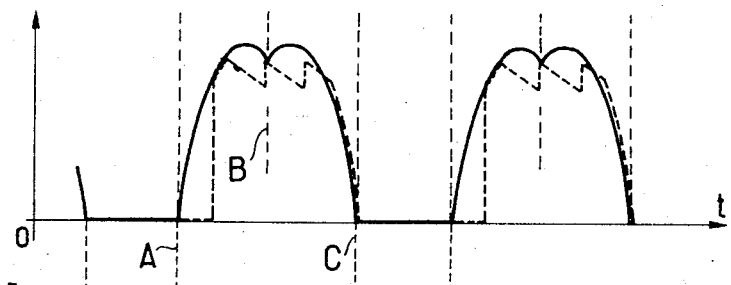
FIG. 6 illustrates the waveform diagram of a phase reference signal which is applied to the input of the gate control circuit of FIG. 2.

FIG. 6 represents as a function of time the phase reference signal RF1. The diagram in full lines is theoretical. In actual practice, the presence of stray or leakage inductances in the alternator 201 more or less modifies this diagram and imparts to it, for example, the form shown in dashed lines.

Figure 7:
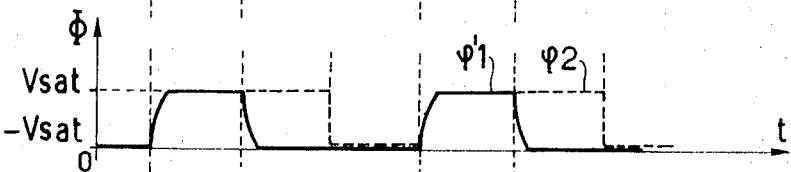
FIG. 7 illustrates the waveform diagrams of two phase reference signals in the gate control circuit of FIG. 2.

FIG. 7 represents as a function of time the signals $\phi'1$ and $\phi2$, in full lines and in dashed lines, respectively.

Figure 8:
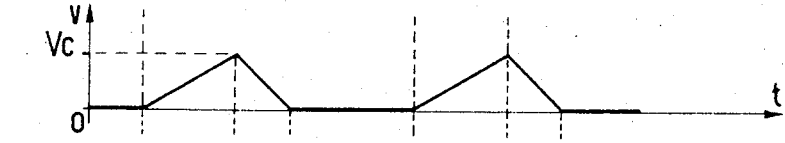
FIG. 8 illustrates, in a particular case, the waveform diagram of the voltage at the terminals of a capacitor of the control circuit of FIG. 2.

FIG. 8 represents as a function of time the voltage at the terminals of the capacitor 22 in the case in which $AB = 0$. Since the potential of the inverted input 30 of the operational amplifier 23 is practically always at ground level, it is its output potential which decreases when the capacitor 22 is charged. The terminal 30 of the capacitor 22 is therefore positive with respect to its terminal being connected to the output of amplifier 23. The voltage Vc at the terminals of the capacitor 22 at the instant A depends upon the difference signal Tc. Since the discharge of the capacitor 22 is effected with a constant current, the regulation of the discharge time is carried out by the regulation of the difference signal Tc.

Figure 9:
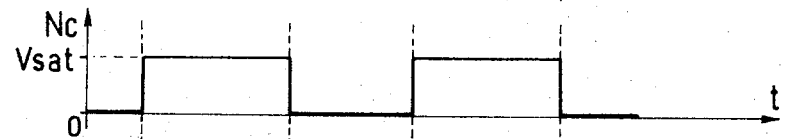
FIG. 9 illustrates the waveform diagram of the output signal of the control circuit of FIG. 2.
Figure 10:
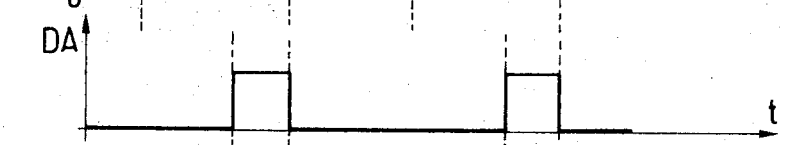
FIGS. 10 and 11 represent the waveform diagrams of two control signals for the discharge and for the charge of the capacitor of the control circuit of FIG. 2.
Figure 11:
Figure 12:
FIG. 12 illustrates the waveform diagram of the starting signal of a thyristor, derived from the output signal of the control circuit of FIG. 2.

FIG. 9 represents as a function of time the signal Nc delivered by the output of the gate control circuit. FIG. 10 represents as a function of time the signal DA delivered by the logic unit 14 of FIG. 2. FIG. 11 represents as a function of time the signal Ar delivered by the logical unit 14 of FIG. 2. FIG. 12 represents as a function of time the ignition control signal ic of the thyristor TH1 of FIG. 1. This signal is provided by the ignition circuit 114 of FIG. 1 and is present in the form of a pulse coordinated to the descending front of the signal Nc.

A control circuit according to the present invention makes it possible to obtain a high degree of precision in the control of the thyristors of the excitation bridge by virtue of the systematic use of operational amplifiers, rendering possible charges at constant current and the interruption of the discharge as soon as the voltage of the capacitor has reached the fixed threshold. It is particularly adapted to the case in which the voltage and the frequencies furnished by the alternator 201 vary within wide limits.

At low voltage, i.e., at the start of the locomotive, the stray or leakage inductances of the alternator assume a great importance and are the cause of significant deformations of the waveform of the supply voltage, which imposes the need for a filtering of the phase reference signal. Besides, it is generally necessary to cause the opening angle of the thyristors to vary within a wide interval. The ignition instant of the thyristor TH1 must then be earlier than the instant B, and the gate control circuit 111 must be adapted to bring about a delay of the ignition instant with respect to the instant A. At high voltage, the waveform is generally much less deformed, and it is advantageous to dispense with the filtering in order to increase the degree of precision. Moreover, in the case of a fixed charge, the opening angle remains small and the regulating interval beginning at the instant B is sufficient to furnish a proper current to the motors 203, while improving the regulating precision, since the delay created is shorter.

The signal AB makes it possible to select the best mode of operation for each case as function of the supply voltage. This signal will be given the value "0" at low voltage and the value "1" at high voltage. The signal AB may generally originate, as has been described hereinabove, from a bistable hysteresis selection circuit, i.e., a circuit with two different voltage thresholds, this circuit being controlled by the difference signal Tc. The signals Tc and AB are common to all pulse generators.

The filter 2 has small dimensions and is not very costly since the static disturbances which arrive on the phase reference signal RF1, for example during the charge of the capacitor 22, are generally not susceptible to leading to the discharge thereof up to the threshold voltage, even in the absence of a filter.

What is claimed is:

1. A self-excitation control device for controlling the energization of an excitation winding of an alternator for supplying direct current motors from multi-phase output terminals through a rectifier supply bridge, said control device comprising an excitation bridge including a thyristor connected between each respective phase output of said alternator and a common point connected to one side of said excitation winding and a rectifier connected between each respective phase output of said alternator and the other side of said excitation winding; a diode connected in parallel with said excitation winding; comparator means for comparing the voltage rectified by said rectifier supply bridge with a reference voltage so as to provide a difference signal representing the difference between these two voltages, a plurality of gate control circuits each having an output connected to the control electrode of one of said thyristors, one regulation input receiving said difference signal, two phase inputs and one control input; means for applying to each of said phase inputs of said gate control circuits a reference phase signal representative of the voltage between a respective one of the output terminals of said alternator and said other side of said excitation winding; selection means responsive to the operation of said motor and alternator for applying to said control input of said gate control circuits a logic signal of first or second value, so that each gate control circuit provides an ignition signal to a thyristor after one of said two phase inputs thereof has received a reference phase signal with a time shift controlled by said difference signal, the phase input receiving said reference phase signal being determined by the value of said logic control signal.

2. A device according to claim 1 wherein an amplitude limiting circuit is connected in parallel with said excitation winding to protect said winding against excess voltages, said amplitude limiting circuit comprising a transformer having a primary and a secondary winding, said primary winding being connected in series with a capacitor across said excitation winding and said secondary winding being connected through a rectifier across a battery.

3. A device according to claim 1 wherein said comparator means includes an amplifier having a controllable amplification factor for amplifying said difference signal and means for inversely varying said amplification factor of said amplifier in accordance with the level of voltage rectified by said supply bridge.

4. A device according to claim 1 wherein each of said gate control circuits comprises a control capacitor, a first switch, charge means connected in series with said first switch between said regulation input and said control capacitor so as to charge said control capacitor in dependence on the value of said difference signal when said first switch is closed, a second switch, first discharge means connected in series with said second switch to said control capacitor to sample the discharge current of said capacitor when said second switch is closed, a third switch, second discharge means connected in series with said third switch to said control capacitor to sample the discharge current of said capacitor when said third switch is closed, detector means for producing a discharge control signal when the charge of said control capacitor has reached a predetermined value, and logic circuit means for controlling the operation of said first, second and third switches in response to signals on said control input and said phase inputs along with said discharge control signal.

5. A device according to claim 4 wherein one phase input of each gate control circuit is connected to a low pass filter which filters the reference phase signal applied thereto.

6. A device according to claim 1 wherein said selection means includes a bistable circuit controlled by said difference signal so that said logic signal passes from said first to said second value when said time shift exceeds a first predetermined threshold and from said second to said first value when said time shift becomes lower than a second predetermined threshold which is lower than said first threshold.

7. A device according to claim 6 wherein an amplitude limiting circuit is connected in parallel with said excitation winding to protect said winding against excess voltages, said amplitude limiting circuit comprising a transformer having a primary and a secondary winding, said primary winding being connected in series with a capacitor across said excitation winding and said secondary winding being connected through a rectifier across a battery.

8. A device according to claim 7 wherein said comparator means includes an amplifier having a controllable amplification factor for amplifying said difference signal and means for inversely varying said amplification factor of said amplifier in accordance with the level of voltage rectified by said supply bridge.

9. Self-excitation device for an alternator connected through a rectifier bridge to at least one direct current motor and having an excitation winding, comprising excitation means for deriving a direct current voltage from the output of said alternator and connection means for applying said direct current voltage to said excitation winding, said excitation means including a thyristor connected between each respective phase output of said alternator and a common point, said connection means connecting said common point to said excitation winding, and control means responsive to the output of said alternator for sequentially triggering said thyristors, said control means including gate control means for generating gate control signals which are shifted in phase in relation to the anode voltage of said thyristors through an angle which is regulated in proportion with the difference between the alternating current output voltage of said alternator and a reference voltage so that said alternating current output voltage is maintained approximately equal to said reference voltage, wherein a resistive attenuator is connected between each phase output of said alternator and said gate control means, said gate control means including a comparator having one input connected to the output of said rectifier bridge and another input receiving said reference voltage, a gate control device having inputs connected to the outputs of said comparator and to each phase output of said alternator through said resistive attenuators, and triggering circuit means responsive to outputs from said gate control device for triggering said thyristors, said control means further including a transformer having a primary winding connected between the cathodes of said thyristors and ground through a high capacity condenser and a secondary winding connected in series with a diode across a non-inductive direct current source, said diode being poled in a direction wherein it blocks application of direct current to said secondary winding when nonconductive and said secondary winding being wound in a direction such that any positive voltage peak in the primary winding above a certain threshold has the effect of rendering the diode conductive.

10. Self-excitation device for an alternator as defined in claim 9 wherein an additional diode and said excitation winding are connected in parallel across the series combination of said primary winding and said high capacity condenser.

\* \* \* \* \*